Feb. 23, 1937.   J. D. McGLYNN   2,071,889
DRUM ROLLING DEVICE
Filed Oct. 6, 1936
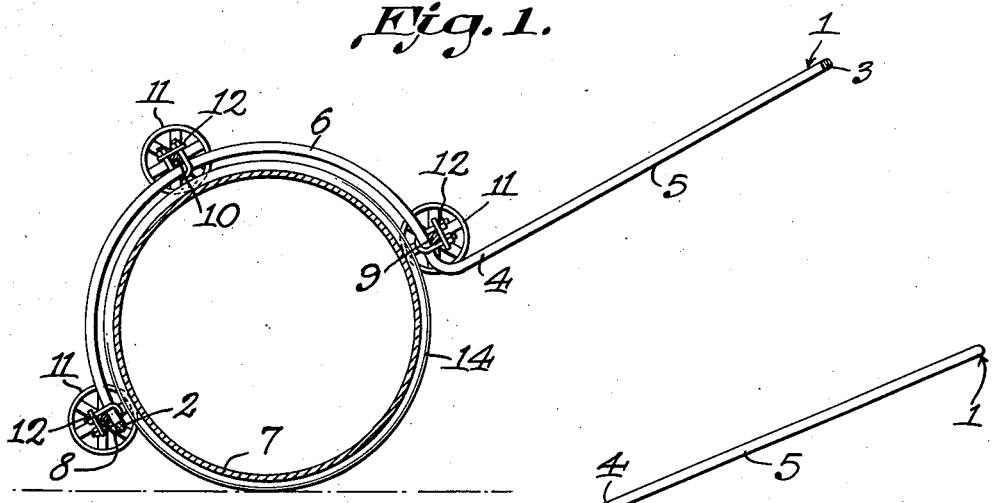
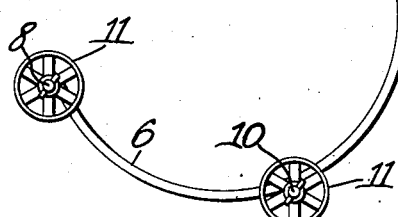
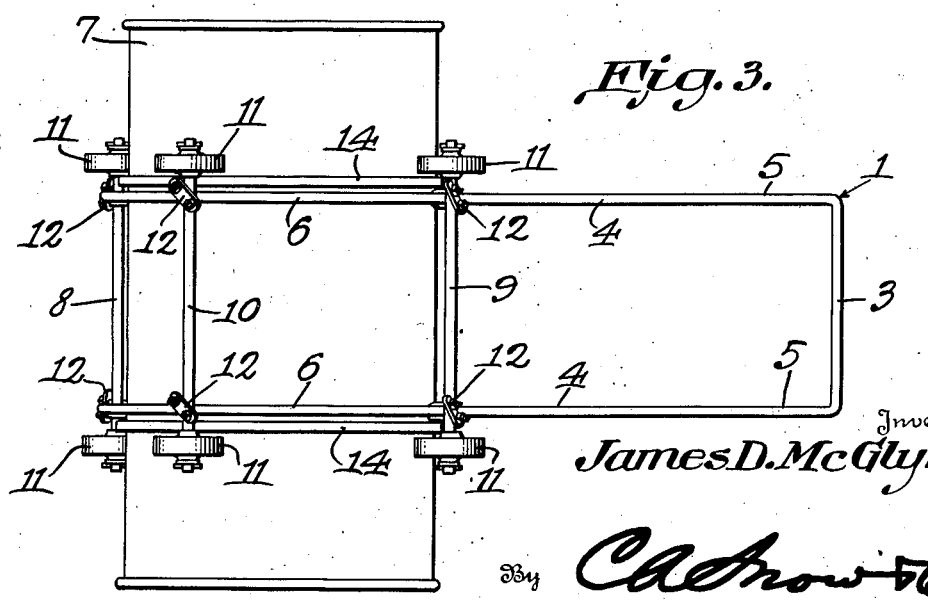
Inventor
James D. McGlynn Patented Feb. 23, 1937

2,071,889

UNITED STATES PATENT OFFICE 2,071,889

DRUM ROLLING DEVICE

James D. McGlynn, Royal Oak, Mich.

Application October 6, 1936, Serial No. 104,296

1 Claim. (Cl. 280—49)

This invention aims to provide a novel means for rolling drums readily, with the drums in contact with the floor or ground, it being possible to control the movement of the drum not only when the drum is rolled in a straight line, either forwardly or backwardly, but, as well, when the drum is rolled laterally in a curved path.

The invention aims to simplify, improve and strengthen the frame which carries the wheels that engage the drum, it being possible to make the frame out of comparatively light stock, and have the frame reenforced by the axles whereon the wheels are journaled.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in longitudinal section, a device constructed in accordance with the invention;

Fig. 2 is an elevation wherein the device has been inverted from the position of Fig. 1;

Fig. 3 is a top plan of the article, mounted on a drum.

The drum roller forming the subject matter of this application comprises a loop-shaped frame 1, preferably made of metal, the frame being of rigid construction throughout. The frame 1 includes a front bar 2, and a rear bar 3, disposed in parallel relation, transversely of the frame. The ends of the front bar 2 and of the rear bar 3 are connected by parallel longitudinal side pieces 4, the frame being of one-piece construction.

Portions 5 of the side pieces 4, and the rear bar 3, form a U-shaped handle whereof the rear bar 3 is a hand grip. Other portions 6 of the side pieces 4 are curved to form a saddle conforming to the cross section of the drum 7 to be rolled.

A front axle 8 is located closely adjacent to the front bar 2. A rear axle 9 is located closely adjacent to the handle of which the elements 5 constitute parts. An intermediate axle 10 is disposed between the front axle 8 and the rear axle 9. Wheels 11 are journaled on the axles 8, 9, and 10, outwardly of the side pieces 4 of the frame 1.

Means 12 is supplied for attaching all the axles 8, 9, and 10 firmly to said other curved portions 6 of the side pieces 4, but for adjustment longitudinally of the said curved portions 6, whereby an operator can locate the wheels of the front axle 8 and the wheels of the rear axle 9 one hundred and eighty degrees apart, and locate the wheels of the intermediate axle 10 midway between the wheels of the front axle 8 and the rear axle 9.

The axles 8, 9, and 10 not only support the wheels 11, but they have another function, in that they act as cross braces for the frame 1, thereby making it possible for the frame to be constructed out of comparatively light stock, and still be strong enough to withstand the strain imposed upon it. It is obvious that in order to be handled conveniently, the device should be as light as possible.

In practical operation, the saddle, including the parts 6, is placed over the drum 7, the wheels 11 being arranged outwardly of the ribs 14 of the drum, as shown in Fig. 3 and in Fig. 1. It is clear that, with the device arranged as shown in the figures last above referred to, the drum 7 may be rolled about as desired. If the drum 7 is rolling down hill, the operator can pull up on the handle bar 3, bring the wheels of the front axle 8 into contact with the ground or floor, and in that way put a braking action on the drum, there being no danger that the drum will get out of control of the operator and run away down hill.

When the device is not in use, and is being trundled from place to place, it may be inverted as in Fig. 2, and, then, the wheels of the intermediate axle 10 constitute supports for the article.

It is to be observed that a device of the class described, in order to be efficient and satisfactory, must control the drum not only when the drum is being moved either forwardly or backwardly in a straight line, but, as well, when the drum is being rolled laterally on a curve. Such a control is possible only if the frame 1, and especially the saddle 6, is rigid. If the saddle 6 is jointed or hinged, the operator cannot control a drum properly in making a lateral curve.

The frame 1 must be narrow, compared with the length of the drum 7. In the drawing, the frame 1 is shown as being about one-half as wide as the drum 7 is long. But note, that the frame should be no more than two-thirds as wide as the drum is long, lest, when the drum is being rolled in a curve, the wheels 11 escape from the ribs 14, unless the ribs are of considerable height, the device then riding off one end of the drum.

The wheels 11 must be large enough to keep the frame 1 at all times clear of the drum 7, regardless of the height of the ribs 14, since, otherwise, there will be an objectionable dragging effect produced in the rolling of the drums. The wheels of the front axle 8 and of the rear axle 9 should be one hundred and eighty degrees apart. If the said wheels are less than one hundred and eighty degrees apart, the operator cannot get a proper push or pull on the drum, since the frame will jump off the drum. If the wheels of the axles 8 and 9 are more than one hundred and eighty degrees apart, then the members 6 must be hinged or jointed, and such a construction is undesirable for reasons hereinbefore set forth.

The general construction of the device is such that it comprises a minimum number of parts, reenforcing each other, it being possible to make a strong and satisfactory article out of light stock, and the general construction being such that the drum can be controlled while it is being rolled forwarly or backwardly in a straight line, or rolled laterally on a curve. With the device forming the subject matter of this application, the drum can be rolled in any desired direction, and the frame will not jump off it.

The means 12 for securing the axles 9, 10 and 8 to the saddle parts 6, for adjustment as aforesaid, may consist of U-bolts, yokes carried by the U-bolts, and nuts on the U-bolts, the nuts engaging the yokes, all as clearly shown in the drawing.

Having thus described the invention, what is claimed is:

A drum roller comprising a loop-shaped frame which is of rigid construction throughout, the frame including parallel transverse front and rear bars and parallel longitudinal side pieces connecting the front and rear bars, portions of the side pieces, and the rear bar, forming a U-shaped handle whereof the rear bar is a hand grip, other portions of the side pieces being curved to form a saddle conforming to the cross section of the drum to be rolled, a front axle located closely adjacent to the front bar, a rear axle located closely adjacent to the handle, an intermediate axle disposed between the front axle and the rear axle, wheels journaled on the axles, and means for attaching all of the axles firmly to said other curved portions of the side pieces, but for adjustment longitudinally of said other curved portions, whereby an operator can locate the wheels of the front axle and the wheels of the rear axle one hundred and eighty degrees apart, and locate the wheels of the intermediate axle midway between the wheels of the front and rear axles, the axles constituting reenforcing cross ties for the saddle.

JAMES D. McGLYNN.